April 13, 1965 M. L. HUBBARD 3,178,013
CONVEYOR
Filed Oct. 30, 1961 2 Sheets-Sheet 1
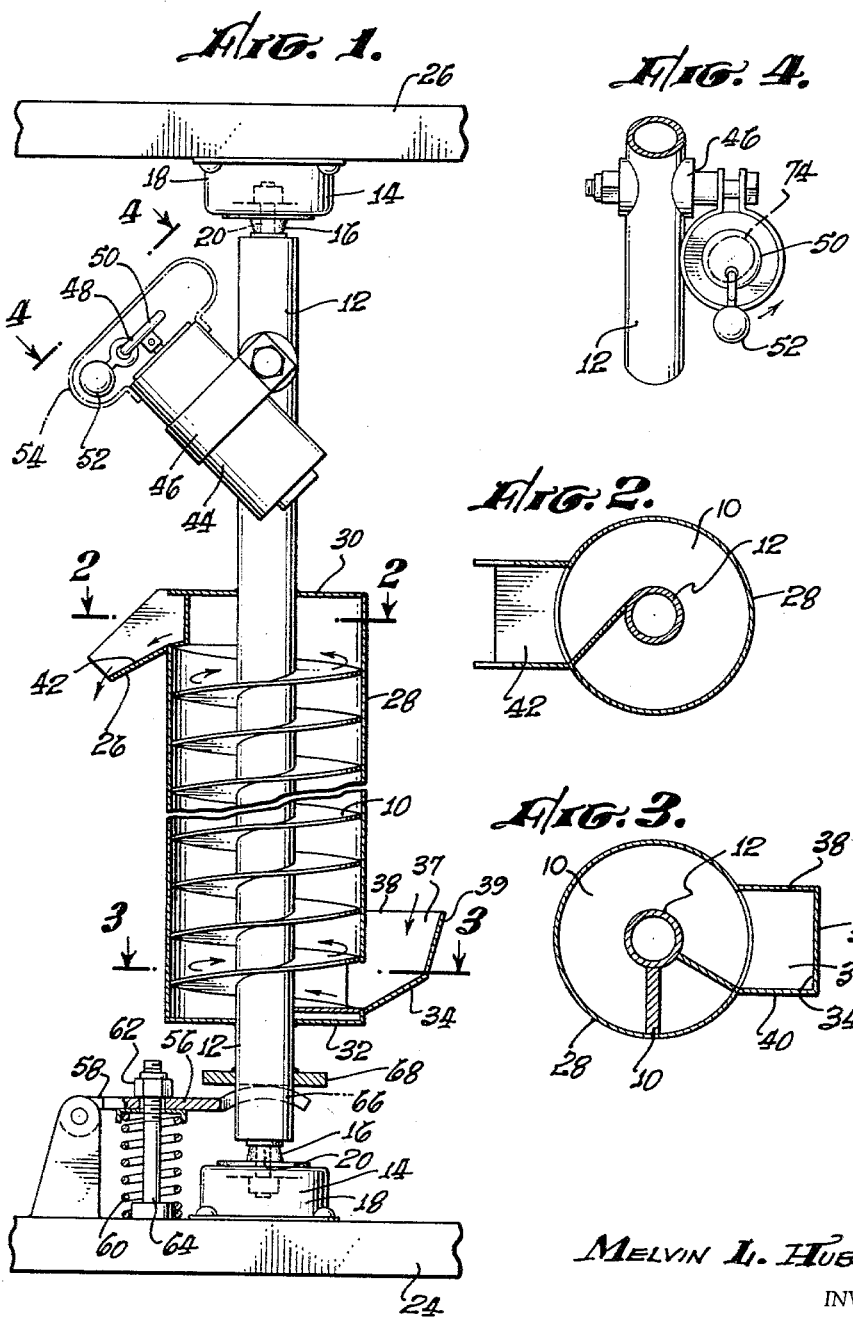
MELVIN L. HUBBARD,
INVENTOR.
BY HIS ATTORNEYS.
HARRIS, KIECH, RUSSELL & KERN.

April 13, 1965   M. L. HUBBARD   3,178,013
CONVEYOR
Filed Oct. 30, 1961   2 Sheets-Sheet 2
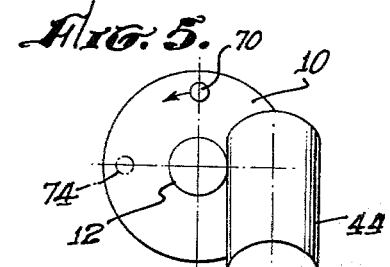
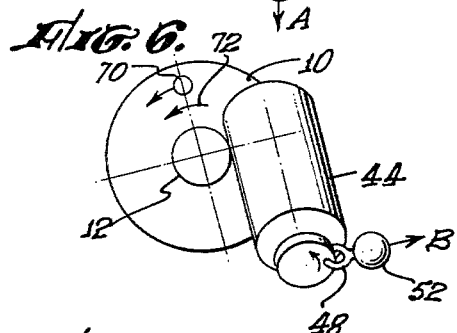
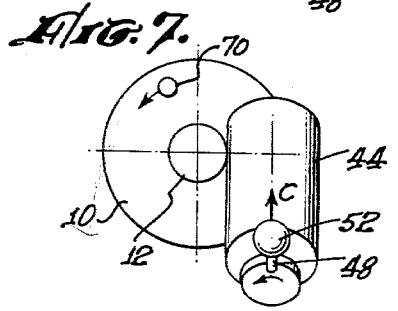
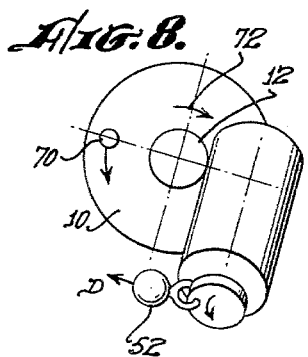
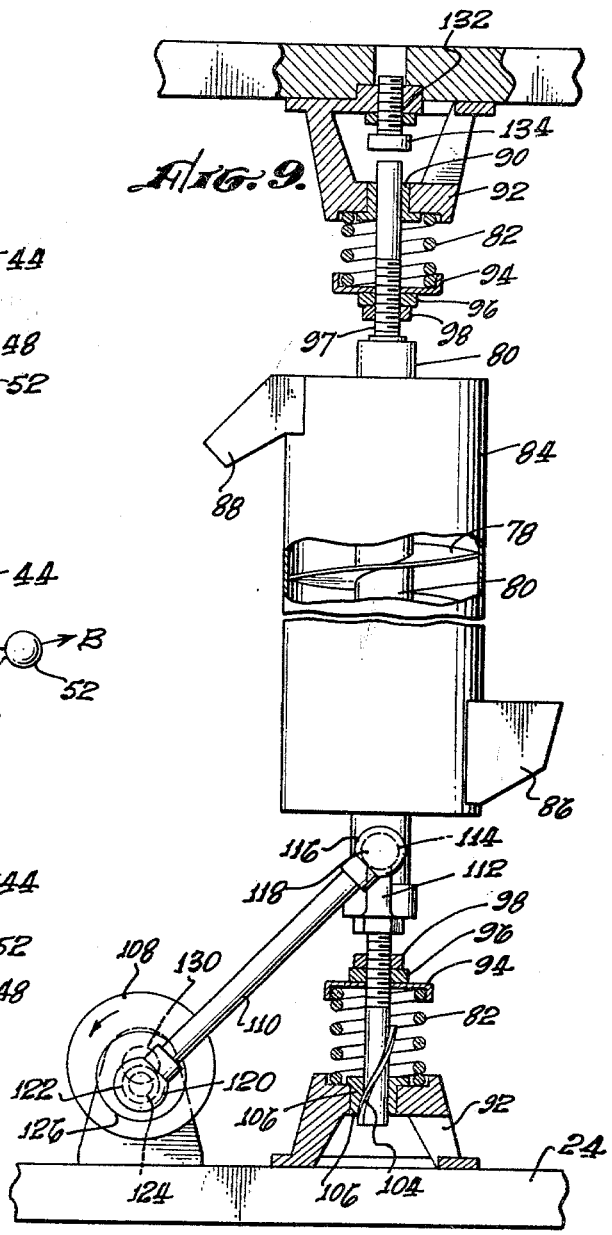
MELVIN L. HUBBARD,
INVENTOR.
BY HIS ATTORNEYS
HARRIS, KIECH, RUSSELL & KERN.

United States Patent Office 3,178,013
Patented Apr. 13, 1965

3,178,013
CONVEYOR
Melvin L. Hubbard, P.O. Box 243, Dana Point, Calif.
Filed Oct. 30, 1961, Ser. No. 148,605
1 Claim. (Cl. 198—220)

This invention relates to conveyors and, more particularly, to spiral type conveyors for the movement of materials.

Spiral conveyors are widely employed for handling bulky materials, for example, sand rock, grain, flour, cement, and the like and even manufactured items such as nuts, bolts, washers and occasionally scrap materials. Spiral conveyors are used for transporting material from a lower to a higher elevation and commonly comprise an enclosed spiral ramp about a vertical shaft that is rotated. A motor is connected to the shaft through suitable gearing and reduction drives. Overloading of the motor due to stoppage of material must be guarded against and to this end shearing pins in the gearing mechanism are provided. Conventional spiral conveyors usually have a very limited capacity range and are normally designed to handle a particular type of bulk material. Conveyors of this type are of a limited versatility and cannot be commonly adapted to handle a material greatly different from that for which the conveyor was designed. It is common experience that the ramp life of such a conveyor is short, especially where the material being handled has abrasive qualities. Wear is promoted by the spiral ramp driving against and screwing into the material under a great force.

It is, therefore, a principal object of this invention to provide an improved spiral conveyor of a simplified design and capable of handling widely diversified types of bulky materials.

A further object of the invention is to provide a spiral conveyor having a design that permits transport of materials either up or down the ramp at a speed ranging from zero to a maximum desired speed.

It is a still further object of the invention to provide a spiral conveyor design whose efficiency increases with the size of the unit and to provide a spiral type conveyor having high efficiency throughout all work loads.

Another object of the invention is to provide a spiral type conveyor having a minimum of moving parts and having in one preferred design no gearing, reduction drives, or shearing pins. Another object is to provide an apparatus having no moving parts in contact with the material being handled, thus significantly extending the ramp life.

A still further object of the invention is to provide an improved spiral conveyor wherein the motor or drive cannot be overloaded regardless of material surges or stoppages of material flow.

Other objects and advantages will appear from the following specification and the drawings, in which:

FIG. 1 is a front elevational view, partially cut away, illustrating one preferred embodiment of the spiral conveyor of the invention;

FIG. 2 is a cross-sectional view taken along line 2—2 of FIG. 1;

FIG. 3 is another cross-sectional view, taken along line 3—3 of FIG. 1;

FIG. 4 is an end view, taken along line 4—4 of FIG. 1, of a flywheel and motor component of the conveyor of FIG. 1;

FIGS. 5-8 inclusive are a sequence of schematic overhead views, illustrating succeeding positions of the flywheel motor component and ramp during operation of the spiral conveyor of FIG. 1; and FIG. 9 is a front elevational view, partially in cross section, illustrating still another form of the spiral conveyor of the invention.

The spiral conveyor illustrated in FIG. 1 has a spiral ramp 10 mounted to permit simultaneous limited vertical and rotational movement. Unlike the conventional spiral conveyor, the ramp 10 of the device of the invention does not freely revolve, there being provided means for imparting successive and limited clockwise and counterclockwise movements to the ramp which are accompanied by an up and down or vertical movement, i.e., a lifting or a lowering of the ramp. The ramp 10, as will be described in further detail later, is subjected to a rapid succession of elliptical orbital motions (resulting from simultaneous rotation and vertical movement of the ramp) which cause particulate materials such as grain or cement to flow in a steady stream, the direction and speed of which may be readily regulated. While it is proper to say that the ramp is moved with limited clockwise and counterclockwise movement accompanied by vertical movement, the ramp, more strictly speaking, moves in an elliptical orbit which orbit for any point of the conveyor lies in a plane set at an acute angle to the axis of rotation of the ramp.

The spiral ramp 10 is located intermediate the ends of a vertical shaft 12 which is supported at its opposite ends in suitable shock absorbers 14. The shock absorbers illustrated in FIG. 1 are conventional Lord-type mounts each comprising a rubber grommet 16 contained principally within a housing 18. The rubber grommet 16 at each end of the shaft 12 encircles a reduced-diameter boss 20 of the shaft, the boss being conveniently threaded at its outer end and held to the grommet 16 by a nut or other suitable means. The shock absorbers 14 are fixed to a floor 24 and an overhead horizontally-disposed beam 26, respectively. The rubber grommet shock absorbers 14 permit limited vertical movement of the vertical shaft 12 and limited rotational movement.

The spiral ramp in the embodiment illustrated is enclosed by a cylindrical wall 28 which is closed at its top and bottom by end walls 30 and 32, respectively. In some applications of the conveyor, the ramp need be only partially enclosed. The spiral ramp has a material inlet 34 adjacent its bottom and a laterally-opening material outlet 36 at its top. In the particular embodiment illustrated, the material inlet 34 is a bin 37 (FIGS. 1 and 3) provided with sides 38, 39, and 40, and an open top. The material outlet 36 adjacent the top of the spiral ramp 10 is a downwardly-extending trough-like chute 42 (FIG. 2). The conveyor of FIG. 1 is designed for upward movement of material. It may be modified for downward movement of material, in which event the material inlet bin 37 is interchanged with the chute 42, permitting introduction of material to the top of the ramp and its removal from the lower end thereof.

A motor 44 is held by an adjustable bracket 46 to the vertical shaft 12. The rotatable shaft of the motor 44 carries an eccentric flywheel 48. The rotatable shaft supporting the flywheel 48 could be driven by an external power source, although conveniently, the flywheel is mounted on the shaft of a motor as illustrated. In the embodiment illustrated, the eccentric flywheel 48 takes the form of a small wheel 50 whose outer perimeter has swiveled to it a weight member 52 through an eye swivel. Other types of swivel joints including a ball type may be used. The weight member 52 may be swiveled directly to the rotatable shaft. The flywheel 48 is preferably enclosed in a guard member 54 indicated in phantom lines, FIG. 1. The flywheel 48 on rotation occupies a plane preferably oriented at an angle of substantially 45° with respect to the vertical shaft 12. The adjustable bracket 46 permits change or re-orientation of the flywheel 48 with respect to the shaft 12.

An adjustable dampening means 56 is provided for regulating vertical movement of the ramp. The dampening means illustrated comprises a generally horizontally disposed pivoted arm 58 which is spring biased upwardly by a coil compression spring 60 against an adjustable nut 62 of a vertical bolt 64. The tension of the coil spring 60 may be varied by turning of the nut 62. The outer end or free end 66 of the pivoted arm 58 cooperates with a projection 68 which may conveniently be a collar of the vertical shaft 12 to limit vertical movement of the shaft. The adjustable dampening means 56 permits regulation of the device to obtain an orbital motion of the ramp most suitable for the transport of a particular material. It is also possible by adjustment of the dampening means 56 to alter the conveyance speed of material being handled. The dampening adjustment most desirable for the transfer of a particular material will be peculiar to each installation, being affected by size of installation, weight, and other factors.

The following description, taken in conjunction with the schematic representations of FIGS. 5–8 inclusive, will clarify the action of the eccentric or off-weighted flywheel 48 and its effect on the spiral ramp 10 and in turn the effect of the spiral ramp upon the material being conveyed. FIGS. 5–8 are schematic overhead representations of the relative positions of the eccentric flywheel 48 and ramp 10 during a 360° cycle of the off-weighted flywheel. The particular ramp illustrated has a right-hand spiral.

Starting from position A of FIG. 5 the weight member 52 rotates in a counterclockwise and upward direction, pulling the ramp 10 and the particle of material 70 resting thereon in an upward and counterclockwise direction. Reference to FIG. 1 will emphasize that the plane of rotation of the eccentric flywheel 48 and its weight member 52 is at an acute angle to the vertical shaft 12. The relative positions of planes of the eccentric flywheel and shaft must be borne in mind in the following discussion if the action of the conveyor is to be understood. It should also be remembered that the ramp 10 follows the flywheel 48 and whatever line of motion the flywheel takes will be assumed by the ramp. At the exact moment illustrated in FIG. 5, the ramp 10, as seen from above, is reversing its direction of rotation. The ramp, strictly speaking, does not undergo a reciprocating motion but moves in an orbit, which orbit is in the plane of rotation of the flywheel 48. The particle 70 at the point of time illustrated in FIG. 5 is moving as indicated by an arrow in a counterclockwise and upward direction along with the surface of the ramp 10, i.e., the ramp and particle are moving together. From the moment the weight member 52 leaves position A on its travel toward position B of FIG. 6, the ramp 10 is moving upwardly and in a counterclockwise direction as indicated by arrow 72 of FIG. 6. The material particle 70 is carried upwardly by the ramp 10. In the quarter cycle wherein the weight member 52 moves from position B of FIG. 6 to position C of FIG. 7, the weight member 52 continues in a counterclockwise and upward direction, pulling the ramp 10 and material 70 in the same direction. When the weight member 52 reaches position C of FIG. 7, there is a change in direction of the ramp 10. In the third quarter cycle represented by the movement of the weight member 52 from the position C of FIG. 7 to position D of FIG. 8, the weight member 52 continues in a counterclockwise direction, but it is now moving downward. The ramp 10 has reversed its direction (as shown by arrow 72) and it is pulled downwardly by the weight member 52 in a clockwise direction, allowing the material 70 to continue, airborne, in a counterclockwise trajectory. In the last and fourth quarter of the cycle, wherein the weight member 52 moves from position D of FIG. 8 to position A of FIG. 5, the weight member 52 continues in a counterclockwise direction and downwardly, pulling the ramp 10 in a clockwise and downward direction. The material 70 is still airborne and continues moving in a counterclockwise trajectory during this portion of the cycle and, at the conclusion of the cycle, as represented by FIG. 5, the particle of material assumes the position 74 indicated in dotted lines in FIG. 5. It will be appreciated that, strictly speaking, the particle 70 does not move with a rotating motion but moves with a more or less straight line trajectory. The distance traveled by the particle 70 per cycle in FIGS. 5–8 is exaggerated for purposes of illustration. It will be seen that there is no sliding of material on the deck of the conveyor of the invention.

The four quarter cycles described above may be viewed as making up two phases, an acceleration phase and a release phase. From position A to position C there is an acceleration and energy is placed into the material 70 in a counterclockwise and upward direction. From position C to position A, the ramp 10 releases its frictional hold on the material 70 and is rotated downward and in a clockwise direction, out from under and in an opposite direction to the material 70. The material throughout the release phase continues airborne and in a counterclockwise direction. The ramp 10 and the material 70 then come together in a different position from that assumed at the outset of the cycle as illustrated in FIG. 5.

Because the ramp 10 is a right-hand spiral, the material 70 gains elevation with each new position. The cycle just described may be repeated many times per second, with the result that the material appears to move in a flowing stream. The eccentric flywheel 48 and the ramp 10, as a result of the motion described above, move in an elliptical orbit as indicated by the dotted lines 74 of FIG. 4. It is this orbital motion in a plane at an angle to the shaft 12 which is responsible for the flow of the material along the ramp surface. The direction of flow of material may be reversed, that is, directed down the ramp 10, by reversing the direction of rotation of the flywheel 48. Upon reversing the direction of the eccentric flywheel 48, velocity is instilled in the material in a clockwise direction, thereby permitting the material to move on a downward, airborne course following the spiral of the ramp 10 downwardly. It will be appreciated that in an installation using a left-hand spiral, other considerations remaining the same, the direction of flow will be the reverse of that described above.

It will be appreciated that by controlling the amount of kinetic energy transferred to the material and by controlling the direction in which kinetic energy is transferred (by change of this axis of rotation of the flywheel) it is possible to regulate the quantity and velocity of the material being conveyed or handled. There are several ways of regulating the operation of the conveyor of the invention. One way comprises a frictional adjustment and involves the use of the adjustable dampening means 56 to "dampen" or alter direction and amount of energy transferred to the material, thereby effecting the amount and velocity of movement. A second adjustment involves reversing the orbital path of the eccentric flywheel 48, thereby achieving a reversal in direction of flow of the material being conveyed. Another possible adjustment involves varying the distance between the eccentric flywheel 48 and the vertical shaft 12 of the conveyor, this being achieved by loosening of the bracket 46 and movement of the motor 44 and its rotatable shaft toward or away from the vertical shaft 12. The angle of the plane of rotation of the flywheel 48 may also be varied through use of the bracket 46. Another manner of regulating the operation of the conveyor involves varying the distance from the flywheel center to the periphery of the weight member 52. This may be achieved by substitution of flywheels of differing designs or by using a flywheel structure of an adjustable nature which permits movement of the weight member 52 toward and away from the rotatable shaft. A suitable adjustable flywheel design includes a weight member of a rod configuration which is held intermediate its length by a ball joint to the rotatable shaft, there being an adjustable provision (e.g., a hook or set screw) for securing the rod weight member to the ball joint. The eccentricity of this adjustable flywheel design is varied by lengthing or shortening of the rod weight member on one side of the rotatable shaft.

The pivoting or swiveling of the weight member 52 of the eccentric flywheel 48 is an important feature of the conveyor of the invention. The attaching of the weight member 52 in this fashion permits a greater work efficiency with a minimum loss in energy. With the swivel connection, the weight member 52 rotates in a more natural orbit relative to its axis of rotation. Thus, while a fixed-mass eccentric flywheel may be employed to impart the orbital motion to the ramp 10, the swivel feature minimizes stresses and promotes more efficient transfer of energy from the conveyor to material, permitting transfer of more material per unit of energy expended. It is important to the best operation of the conveyor that the swivel permit complete freedom of movement of the weight member in a plane which includes the rotatable shaft (a swivel taking the form of a hinge and pin will accomplish this); freedom of movement of the weight member in a transverse plane to the foregoing is not necessary but is desirable.

The conveyor of FIG. 9 employs a very similar orbital motion for the transfer of material as the conveyor of FIG. 1, but the motion is obtained by use of a considerably different structure than that illustrated in FIG. 1. The conveyor of FIG. 9 comprises a vertical spiral ramp 78 supported intermediate the ends of an elongated shaft 80 which is flexibly supported at its opposite ends by coil springs 82. The spiral ramp 78 is enclosed by a cylindrical wall 84. The cylindrical wall 84 at its lower end has a bin 86 and at its top a downwardly extending chute 88.

The shaft 80 at its upper end is slidably supported by a bearing 90 of a bracket 92. The shaft 80 is free to move vertically to a limited extent and also is capable of a limited rotational movement. The coil spring 82 at the upper end of the shaft is positioned between a retainer 94 and the bracket 92. The tension of the spring 82 may be adjusted by turning an adjustment nut 96 carried by threads on an extension 97 of the shaft 80. A locking nut 98 holds the nut 96 and retainer 94 in position. The other end of the shaft 80 is provided with a similar retainer 94, nuts 96 and 98 and a bracket 92. The lower end of the shaft 80 has a spline 104 which cooperates with an internal thread of a stationary bearing 106 to impart rotation and vertical movement to the shaft 80 and spiral ramp 78 upon application of a moving force. The bearing 106 is supported by the bracket 92. The moving force is supplied by a motor 108 which is connected through a suitable linkage including a connecting arm 110 to the vertical shaft 80 of the conveyor. The vertical shaft 80 supports a short lateral stem 112 which at its upper end terminates in a ball 114 of a ball and socket joint 116. The socket 118 of the joint is carried at the upper end of the aforementioned connecting arm 110. The connecting arm 110 at its lower end supports another socket 120 which encloses a ball 122 attached to a horizontally disposed stub shaft 124. The connecting arm 110 or one of its sockets may incorporate an adjustable coil spring to take up movement in the event of malfunctioning of the conveyor. The stub shaft 124 is carried by an eccentric 126 which is driven by a shaft 130 of the motor 108. Movement of the connecting arm 110 imparts a limited vertical and rotational movement to the spiral ramp 78. It is possible to supply the required simultaneous vertical and rotational movement to the ramp 78 by a suitable linkage between the motor 108 and conveyor without utilizing the spline 104 at the lower end of the vertical shaft 80. However, the desired movement is most easily obtained with the use of the spline 104.

An adjustable dampening means 132 located at the upper end of the vertical shaft is supplied as one means of regulating the flow of material. The dampening means 132 comprises an anvil member 134 whose distance from the upper end of the vertical shaft 80 is adjustable. The anvil member 134 is so positioned as to engage the upper end of the vertical shaft 80 as the ramp 78 completes its half cycle of orbital rotation. More exactly speaking, the vertical shaft 80 strikes the anvil member 134 just shortly before the ramp 78 reverses its direction of rotation, thereby creating a sharp transfer of energy to the material being conveyed just before the ramp begins its descent. The dampening means 132 is not necessary for the operation of the device; however, it allows for a means of control of flow as well as promoting efficiency.

Although exemplary embodiments of the invention have been disclosed herein for purposes of illustration, it will be understood that various changes, modifications, and substitutions may be incorporated in such embodiments without departing from the spirit of the invention as defined by the claim which follows.

I claim:

A conveyor comprising:
 a spiral ramp flexibly mounted to permit simultaneously limited vertical and rotational movements thereof; and
 means for imparting an orbital motion to the ramp in a plane set at an acute angle to the axis of rotation of said ramp, said means including an eccentric member rotatably supported and rigidly held to the spiral ramp, said eccentric member being oriented to rotate in a plane set at an acute angle to the axis of rotation of said ramp and including a swivelled weight member, said weight member being movable in a first plane including the axis of rotation of said rotatable eccentric member and also being movable in a second plane disposed at a right angle to said first plane, said second plane extending transversely of the axis of rotation of the eccentric member with the swivel of said swivelled weight member including an interengaging eye and eye hole.

References Cited by the Examiner

UNITED STATES PATENTS

| 1,056,215 | 3/13 | Reynolds | 209—366.5 X |
|---|---|---|---|
| 2,630,210 | 3/53 | Carrier. | |
| 2,818,968 | 1/58 | Carrier. | |
| 2,827,062 | 3/58 | Nitsche. | |
| 2,827,157 | 3/58 | Tsuchiya. | |
| 2,875,889 | 3/59 | Sherwen. | |
| 2,927,683 | 3/60 | Carrier | 74—61 |
| 3,053,379 | 9/62 | Roder. | |
| 3,053,380 | 9/62 | Spurlin. | |

FOREIGN PATENTS

| 247,930 | 3/11 | Germany. |
|---|---|---|
| 838,072 | 6/60 | Great Britain. |

SAMUEL F. COLEMAN, *Acting Primary Examiner.*

ERNEST A. FALLER, JR., EDWARD A. SROKA,
*Examiners.*